United States Patent
Lamberts

(10) Patent No.: US 7,225,293 B2
(45) Date of Patent: May 29, 2007

(54) METHOD, SYSTEM, AND PROGRAM FOR EXECUTING INPUT/OUTPUT REQUESTS

(75) Inventor: Bernd Lamberts, Cupertino, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 540 days.

(21) Appl. No.: 10/463,012

(22) Filed: Jun. 16, 2003

(65) Prior Publication Data

US 2004/0255055 A1    Dec. 16, 2004

(51) Int. Cl.
G06F 13/20    (2006.01)

(52) U.S. Cl. .................................... 711/112

(58) Field of Classification Search .............. 711/112; 710/39

See application file for complete search history.

(56) References Cited

U.S. PATENT DOCUMENTS

| | | | |
|---|---|---|---|
| 4,583,166 A | 4/1986 | Hartung et al. | |
| 5,428,802 A | 6/1995 | Anglin et al. | |
| 5,440,716 A | 8/1995 | Schultz et al. | |
| 5,548,795 A | 8/1996 | Au | |
| 5,664,143 A | 9/1997 | Olbrich | |
| 5,729,718 A | 3/1998 | Au | |
| 5,890,208 A | 3/1999 | Kwon | |
| 5,909,691 A | 6/1999 | Schultz et al. | |
| 5,937,426 A | 8/1999 | Sokolov | |
| 6,078,998 A * | 6/2000 | Kamel et al. | 711/151 |
| 6,272,565 B1 | 8/2001 | Lamberts | |
| 6,292,856 B1 * | 9/2001 | Marcotte | 710/39 |

OTHER PUBLICATIONS

Thomasian et al., "Some New Disk Scheduling Policies and Their Performance", 2002, ACM, p. 266-267.*
Iyer et al., "Anticipatory scheduling: A disk scheduling framework to overcome deceptive idleness in synchronous I/O", 2001, ACM Symposium on Operating Systems Principles.*
Jacobson et al., "Disk scheduling algorithms based on rotational position", 1995, HP Laboratories Technical Report, 1995.*
Seltzer et al., "Disk Scheduling Revisited", 1990, 1990 Winter Usenix.*
Worthington et al., "Scheduling Algorithms for Modern Disk Drives", 1994, ACM, p. 241-251.*
Huang et al., "Implementation of a Rotation-Latency-Sensitive Disk Scheduler", 2000, State University of New York at Stony Brook.*

* cited by examiner

Primary Examiner—Kevin L. Ellis
(74) Attorney, Agent, or Firm—David W. Victor; Konrad Raynes & Victor LLP

(57) ABSTRACT

Provided are a method, system, and program for executing Input/Output (I/O) requests. Delay times associated with processing a plurality of I/O requests are determined. The determined delay times for the I/O requests are adjusted according to priorities assigned to the I/O requests and a determination is made of an ordering of the I/O requests based on the adjusted delay times. At least one I/O request is executed according to the determined ordering.

32 Claims, 5 Drawing Sheets

METHOD, SYSTEM, AND PROGRAM FOR EXECUTING INPUT/OUTPUT REQUESTS

BACKGROUND OF THE INVENTION

1. Field of the Invention

The present invention relates to a method, system, and program for executing Input/Output requests.

2. Description of the Related Art

A hard disk drive receives input/output (I/O) requests with respect to locations on a disk drive. The I/O requests may be received at a rate faster than they can be executed with respect to the disk drive permanent storage medium. In such case, the I/O requests are either queued or postponed. FIG. 1 illustrates the arrangement of a recording surface typical for a disk drive 2 divided into concentric circular "tracks" on the disk surface. If there are multiple disks, then the vertical alignment of the tracks, on the disks aligned in parallel, together comprise a cylinder (physical definition). The outer cylinder is shown as reference 4. Each cylinder is further divided into user data sectors 6a-h and prerecorded servo sectors 8a-h. A logical block address ("LBA") is used to address a specific location (user sector) within the disk stack and is mapped by the disk drive control electronics to physical location, the head number indicates a particular head in a multi-disk system, and sector.

The total access time for an individual request can be broken-up into sequential phases, referred to as seek time and rotational time. Seek time is the time period for the servo system to position the actuator from the current head and cylinder position to the new target head and cylinder position. The rotational time represents the remaining time, after seek completes, to rotate the sector from the source or current sector location to position the target sector under the transducer read/write head.

Thus, the total access time is determined by the seek time for radial positioning and the rotational access time for circumferential positioning the head over the target sector. Further details of how to calculate the seek and rotational times are described in U.S. Pat. No. 5,729,718, entitled "System for Determining Lead Time Latency as Function of Head Switch, Seek, and Rotational Latencies and Utilizing Embedded Disk Drive Controller for Command Queue Reordering," which patent is incorporated herein by reference in its entirety.

Queued I/O requests do not have to be executed in the order they are received. Thus, the queued I/O requests may be reordered to maximize throughput. One reordering method, termed "Shortest Seek Time First," or SSTF, reorders requests such that the request with the shortest seek time with respect to the request being executed is executed next. Current rotational position ordering (RPO) methods reorder the queue to minimize the combination of seek time and rotational time, or optimize total throughput. U.S. Pat. Nos. 5,729,718 and 5,548,795, entitled "Method for Determining Command Execution Dependencies Within Command Queue Reordering Process," which patents are incorporated herein by reference in their entirety, describe an RPO method for queuing requests that considers both seek and rotational delay times. Each queued request includes a field to store the results in calculating the delay time with respect to a reference request, which is the request currently being executed at the head of the queue. This latency time is calculated for each queued request with respect to a request at some specified position in the queue, e.g., the head of the queue, or n calculations in a queue of n I/O requests. The request having the shortest execution time is promoted to the position immediately following the current command being executed (e.g., head of the queue). This algorithm is then repeated and execution times are calculated with respect to the just promoted I/O request. Thus, with current RPO reordering techniques, calculations in the order of $n^2$ are performed to completely reorder the entire queue. Alternatively, shorter sub-optimal reordering techniques can be applied.

With current prior art queuing techniques, the I/O queue in the disk drive unit is limited in size and maintains limited information on attributes of the queued I/O requests. For certain low priority I/O requests, such as those initiated by applications performing background, backup or clean-up related operations, the benefits of reordering such requests are minimal because, from the standpoint of the application that initiated the request, improved execution time of the I/O request is not necessary. In such instances, the costs of reordering the queue substantially outweigh the benefits of any reordering. Moreover, with current RPO reordering techniques, the processor overhead needed to reorder the entire queue can have significant affects on performance as the processing of I/O requests is delayed until the queue is reordered. Furthermore, since in many applications response time is at least as important as overall throughput, the execution of low priority commands can be detrimental to other more time critical commands. Furthermore, for certain applications the overall execution time of the application can depend on the response time or sequence of the commands being worked through. In current art, applications may disable the reordering operations to eliminate the cost of reordering, which has the negative effect of increasing request response times.

Thus, there is a need in the art for an improved methodology for reordering I/O queues.

SUMMARY OF THE PREFERRED EMBODIMENTS

Provided are a method, system, and program for executing Input/Output (I/O) requests. Delay times associated with processing a plurality of I/O requests are determined. The determined delay times for the I/O requests are adjusted according to priorities assigned to the I/O requests and a determination is made of an ordering of the I/O requests based on the adjusted delay times. At least one I/O request is executed according to the determined ordering.

In further implementations, the I/O requests are directed to addressable locations on a storage medium accessed by an I/O mechanism. Determining the delay times comprises determining delay times to access start addresses of the I/O requests on the storage medium from an I/O mechanism position.

Yet further, the I/O mechanism may comprise a read/write head and the determined delay time as well as an expected execution time for one I/O request may include a seek time and rotational time for the I/O mechanism to access the start address of the I/O request.

In further implementations, the I/O mechanism comprises a read/write head and the read/write head and storage medium are contained in a storage unit. In such implementations, the steps of determining the delay times, adjusting the delay times according to the priority of the I/O requests, and determining the ordering of the I/O requests are performed by the storage unit.

In still further implementations, the I/O mechanism comprises a read/write head and the read/write head and storage medium are contained in a storage unit. In such further implementations, the steps adjusting the delay times according to the priority of the I/O requests and determining the ordering of the I/O requests are performed by a device driver program in a computer system coupled to the storage unit. The device driver program transmits the I/O requests in the determined ordering to a processor in the storage unit, wherein the storage unit executes the at least one I/O request against the storage medium.

The described implementations provide techniques for determining an order in which to execute queued I/O requests that considers the priority of the I/O requests.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
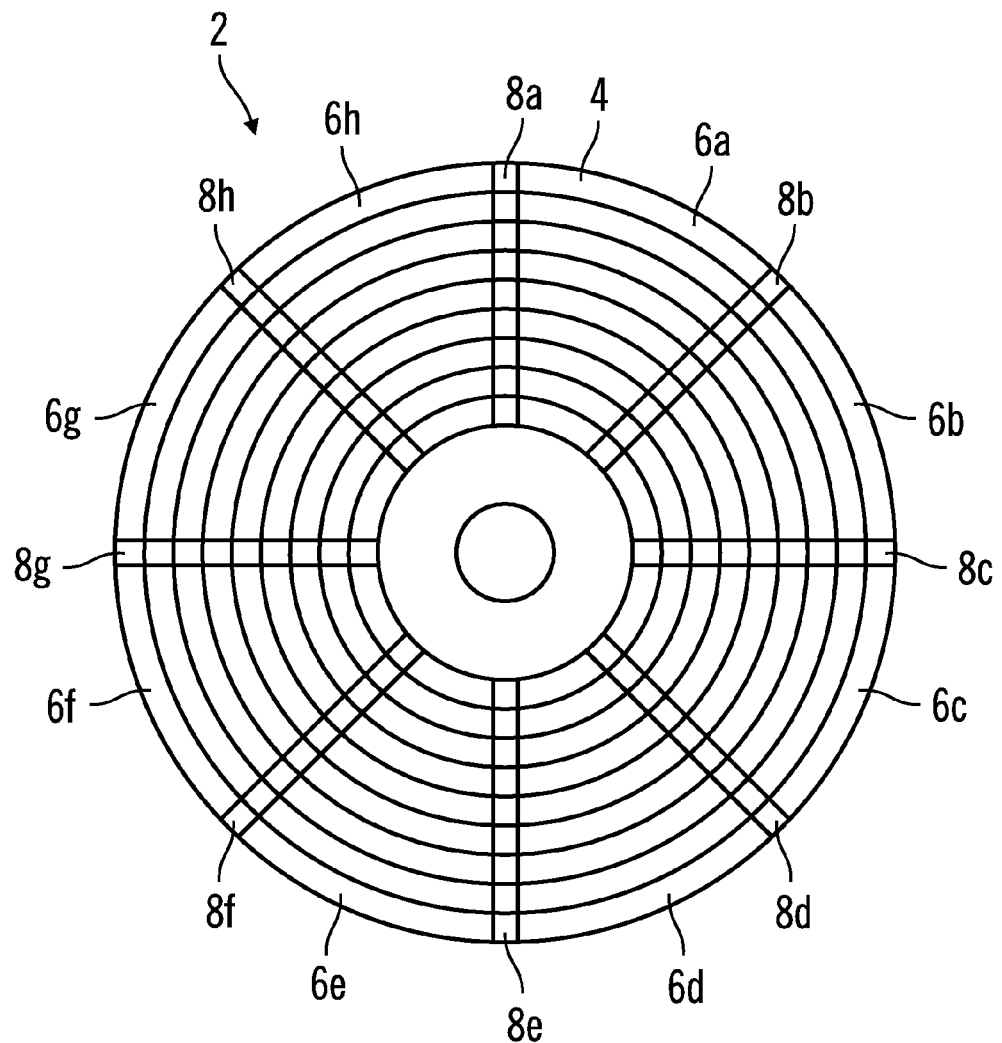
FIG. 1 is a block diagram that illustrates the arrangement of data within a recording disk in accordance with the prior art.
Figure 2:
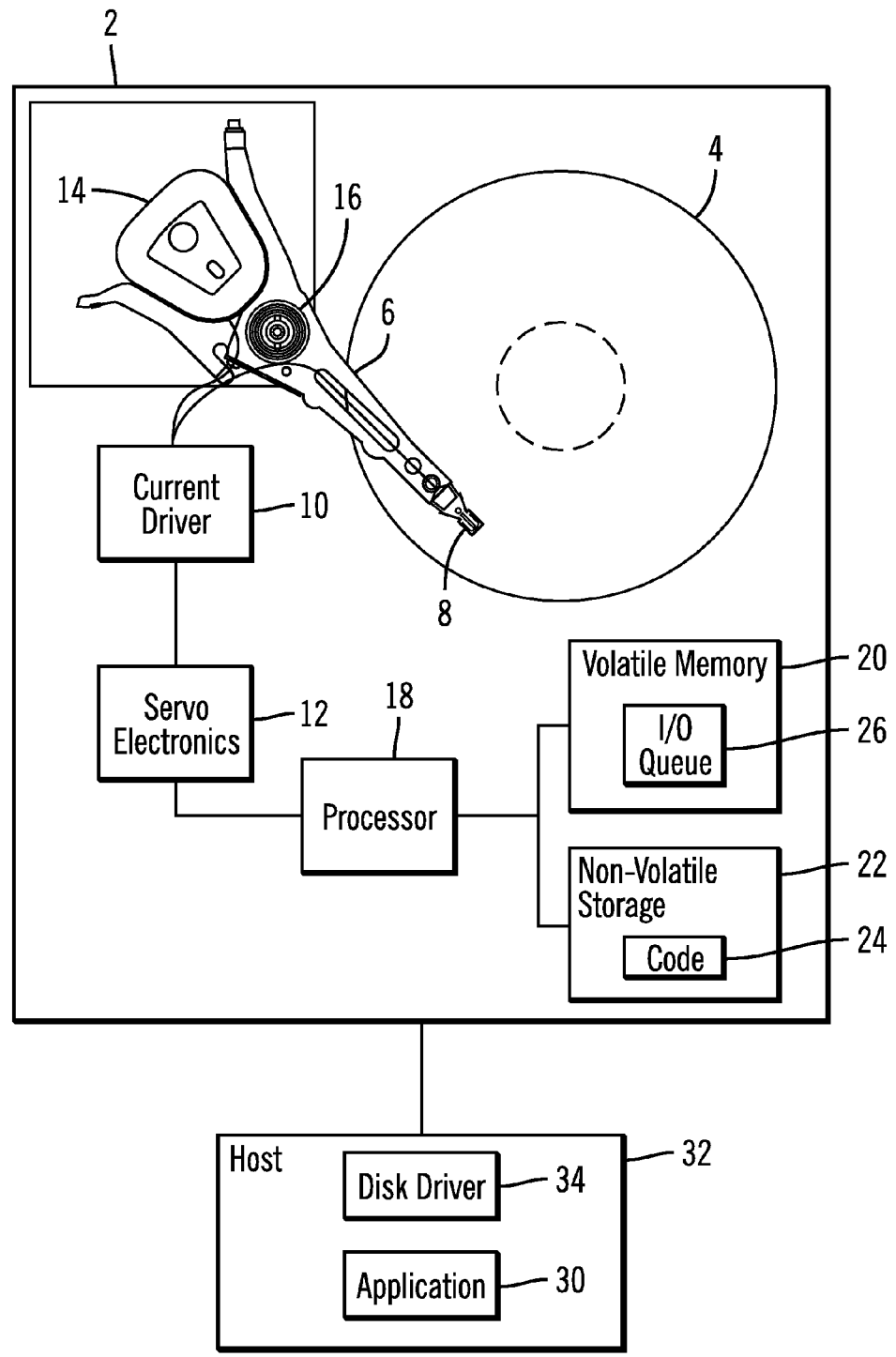
FIG. 2 illustrates a diagram of the hard disk drive unit and system in which aspects of the invention are implemented.

FIG. 2 illustrates a disk drive system 2, including one or more rotating disks 4 (only one is shown), an actuator assembly 6 to move a slider 8 across the disk 4 surface. The slider 8 houses the read and write heads. The disk drive system 2 further includes a current driver 10 that converts the digital signal of a calculation from servo electronics 12 or processor 18 to actual current that is applied to a voice coil motor (VCM) 14. The VCM 14 comprises a coil that sits between two magnets. The current driver 10 applies current to the VCM 14 to cause the coil to react and move through a magnetic field to move the actuator 6.

In certain implementations, the slider 8 is a magnetoresistive (MR) head device. However, in alternative implementations, the slider 8 may include heads made of other materials known in the art. The servo electronics 12 provides a closed loop feedback system to insure that the head follows the tracks accurately and to control smooth transitions when the head "seeks" from one track location to another track. The actuator 6 pivots around a shaft 16 in response to the torque produced by the VCM 14. The servo system may provide a deterministic system such that times can be derived from a geometric arrangement. Thus, after being provided with the details about geometry and servo, the servo system can calculate delay, access and execution times.

A processor 18 manages read/write operations and controls other disk operations. The processor 18 utilizes a volatile memory 20, such as a random access memory (RAM) or registers, as a working memory in which instructions and data are temporarily loaded for program execution.

A non-volatile storage 22, such as a read-only memory (ROM), programmable ROM (PROM), electronically programmable ROM (EPROM), flash memory, etc., stores program instructions and constants, referred to as code 24, loaded and executed by the processor 18 to perform the disk drive operations. Alternatively, the code 24 described herein as performed by processor 18 along with the volatile memory 20 and non-volatile storage 22 may be to a certain degree implemented as hardware, such as an Application Specific Integrated Circuit (ASIC).

Figure 3:
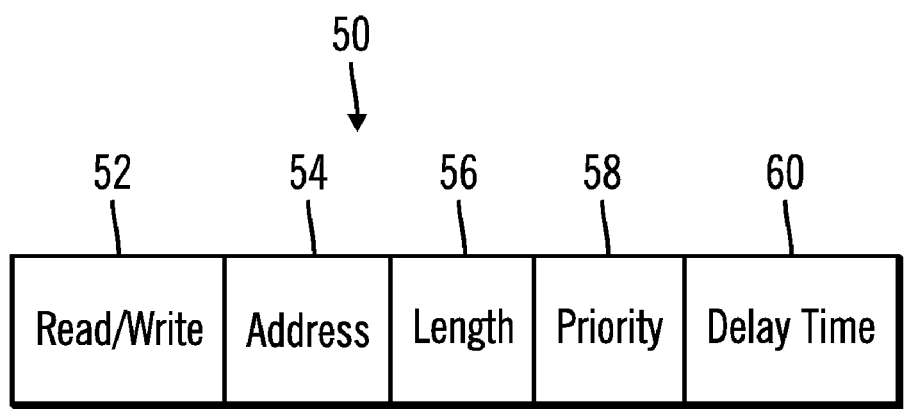
FIG. 3 illustrates fields maintained with a queued I/O request in accordance with implementations of the invention.

In described implementations, the processor 18 maintains in memory 20 an Input/Output (I/O) queue 26 that queues I/O requests received from an external source, such as a host application 30. FIG. 3 illustrates the fields in a queued I/O request 50, including a type field 52 indicating whether the request is a read or write; an address field 54 indicating the start address of the request, such as a fixed block address; a length field 56 indicating a length of the request, which may be expressed as a byte length; a priority field 58 indicating a priority (and possible dependencies) of the I/O request as assigned by an external application 30 that initiated the request; and a delay time 60 which comprises the total access time to access the location indicated in address field 54 from a the head position.

FIG. 2 further shows an application 30 executing in a host system 32 coupled to the disk drive 2. The application 30 communicates I/O requests to the disk drive 2 via a disk driver program 34. The disk driver 34 would perform operations performed by disk drivers 4 known in the art and additional operations described herein. The host system 32 may comprise any computer system known in the art, such as a workstation, desktop computer, server, telephony device, portable computer, hand held computer, etc. In certain implementations, the disk drive 2 may be located in the host 32 housing and connect to the host motherboard or an extension card, such as a Peripheral Component Interface (PCI) card in the host 32. Alternatively, the disk drive 2 may be managed by a separate controller, such as a storage subsystem, where the disk drive 2 may be one of a plurality of disk drives, e.g., a Redundant Array of Independent Disks (RAID), Just a Bunch of Disks (JBOD), Direct Access Storage Device (DASD), etc. In such implementations, where the disk drive is in a separate housing from the host 32, the host 32 would communicate I/O requests generated by the application 30 to the system including the disk drive 2 over a network or through a direct connection.

The application 30 (FIG. 2) may assign a priority to I/O requests, where the priority may be maintained in the priority field 58. The priority in the priority field 58 may be the exact priority value assigned by the application 30 or an adjusted priority, where the disk driver 34 adjusts the priority. In certain implementations, a higher priority indicates a relatively more important request that the application 30 may need processed before operations can continue, where a relatively lower priority request does not have to be immediately processed in order for application operations to proceed.

Figure 4:
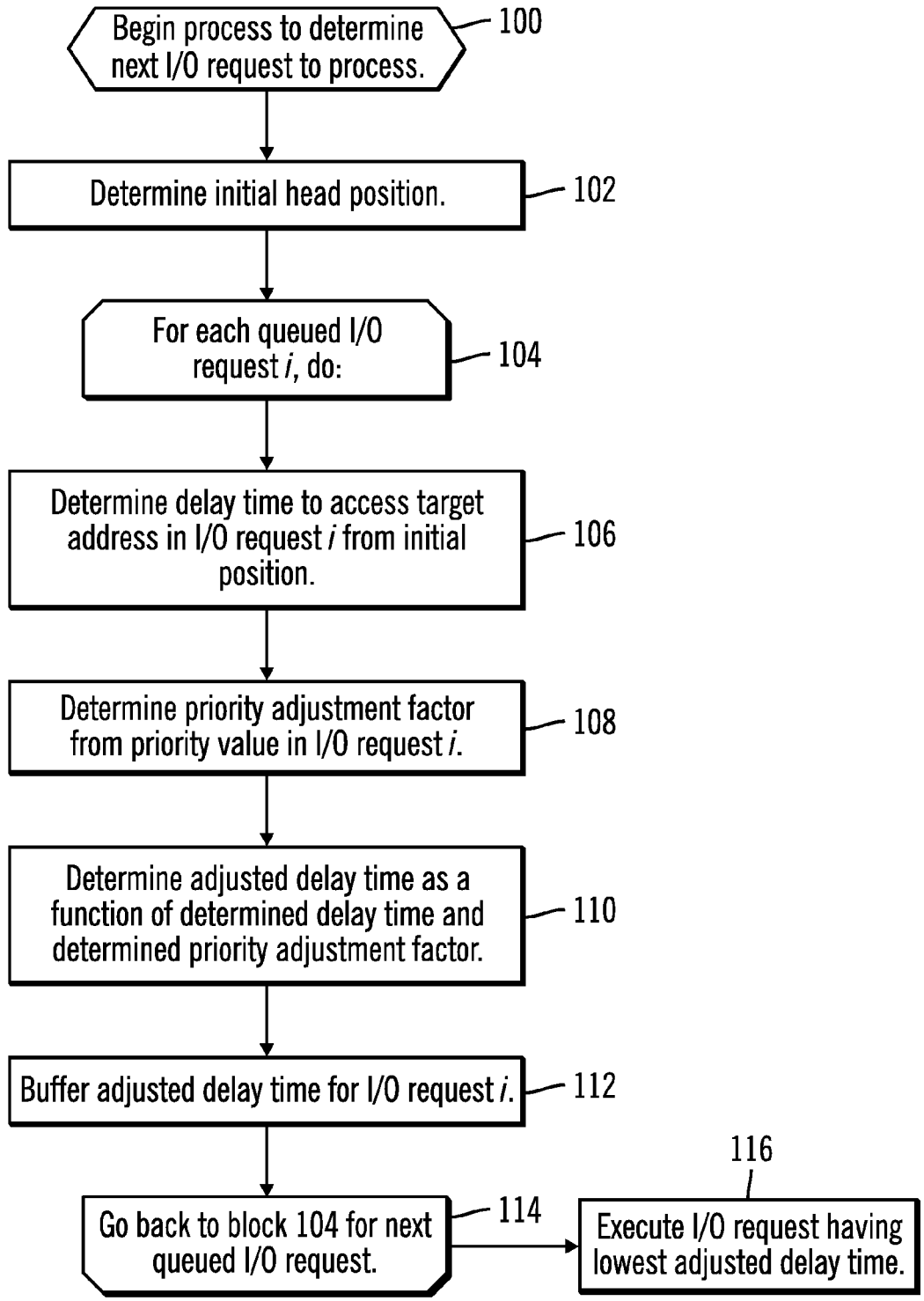
FIGS. 4 and 5 illustrate logic to order queued I/O requests in accordance with implementations of the invention.

FIG. 4 illustrates logic implemented in the disk drive code 24 (FIG. 2) to process I/O requests from application 30. Control begins at block 100 with the processor 18 beginning the process to determine the next I/O request to process. This process may begin after completing a current I/O request or while a current I/O request is being processed in order to determine the next I/O request to process before the I/O request currently being processed completes. The processor 18 determines (at block 102) the initial head position where the slider 8 will be located after completing the execution of the I/O request currently being processed, which may comprise the address 54 plus byte length 56 of the I/O request currently being processed. For each queued I/O request i, the processor 18 performs the steps at blocks 104 through 114. At block 106, the processor 18 determines the delay time to access the address 54 of I/O request i from the determined initial position, which may comprise both a seek and rotational time components, i.e., a latency time. A priority adjustment factor is determined (at block 108) based on the priority 58 the application assigned to the I/O request. The priority adjustment factor may be the application assigned priority value or a value that results from the operation of a function that uses the application assigned priority value to produce the priority adjustment factor.

The processor 18 then determines (at block 110) an adjusted delay time as a function of the determined delay time and the determined priority adjustment factor. In certain implementations, the delay time would be adjusted downward for relatively higher priority requests, which makes the I/O request i more likely to be processed next, and adjusted upward for relatively lower priority requests, which makes the I/O request less likely to be processed next. The priority adjusted delay time for I/O request i is then buffered (at block 112). In certain implementations, the priority adjusted delay time may be stored in the delay time field 60 of I/O request i. After determining the priority adjusted delay for all queued I/O requests, when the current I/O request has completed the processor 18 will execute the I/O request having the lowest priority adjusted delay time.

With the logic of FIG. 4, the priority assigned to an I/O request by the application 30 that initiated the I/O request is used to adjust the delay time that the disk processor 18 considers to order the queue according to both the access time, based on rotational and seek times, and the priority of the request. This logic allows I/O requests having a relatively higher priority to be selected over lower priority requests for comparable delay times. The queued I/O requests may have priority assigned by a single application or multiple applications if multiple applications initiate the queued I/O requests. In this way, the reordering algorithm shown in FIG. 4 would optimize queued I/O request selection based on priority and access times across application programs, where requests initiated from applications issuing higher priority requests would have a greater likelihood of being executed before I/O requests initiated by applications operating at a lower priority. In certain implementations, the applications may use the same priority scheme and values or, alternatively, the disk driver 34 may normalize priority values for I/O requests across applications. Another advantage of having the application assign priority is that the applications are aware of their priority needs with respect to the data, whereas the disk drive is not aware of the applications' data needs.

Figure 5:
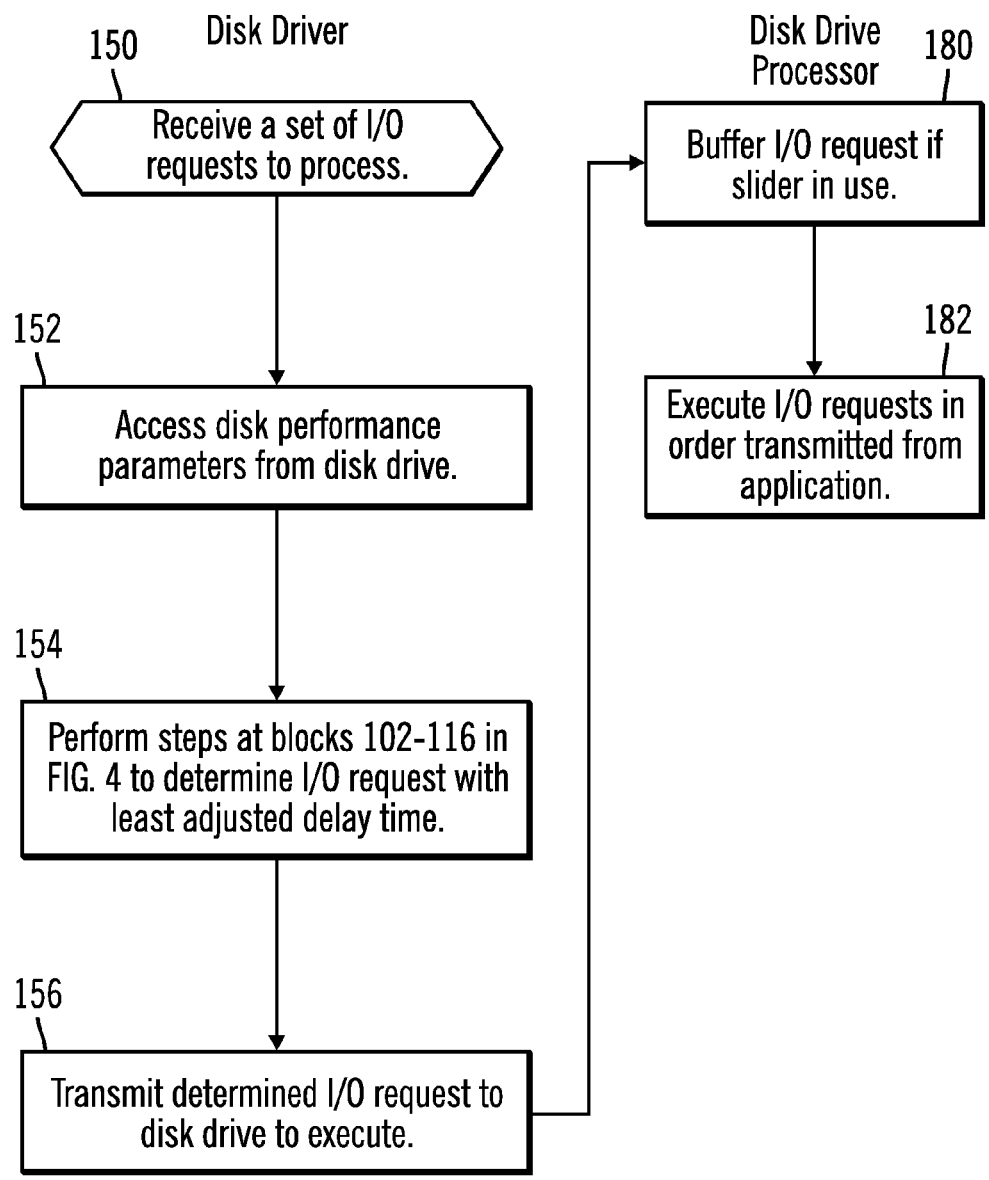

FIG. 5 illustrates an alternative implementation for the reordering algorithm where the disk driver 34 performs certain of the priority and delay time calculation operations. Control begins at block 150 where the disk driver 34 receives a set of I/O requests from one or more applications having an application assigned priority. In response, the disk driver 34 would access (at block 152) the disk performance parameters, such as average seek time or rotation time. The disk driver 34 may then perform (at block 154) steps 102 through 116 to determine the I/O request having the lowest priority adjusted delay time to execute. The disk driver 34 may then transmit (at block 156) one or more of the I/O requests, ordered according to their priority adjusted delay time, to the disk drive 2 to execute.

The disk drive processor 18 may buffer (at block 180) the received I/O requests if current requests are being processed and then execute (at block 182) the I/O requests in the priority adjusted delay time ordering determined by the disk driver 34. In such implementations, the disk drive 2 components, such as the processor 18, would not perform the optimization selection based on a priority adjusted delay time, because such operations would be performed by the disk driver 34.

In alternative implementations, the disk drive processor 18 may perform certain of the operations. For instance, the processor 18 may calculate the delay times and pass the calculated delay times back to the disk driver 34 to perform the priority adjustment operations and reorder the requests according to such priority adjustments. The disk driver 34 may then return a priority adjusted delay time reordering of the queued I/O requests to the disk drive 2 that the disk drive processor 18 would use to determine the order in which queued I/O requests are executed.

With implementations where the disk driver 34 performs certain or all of the priority adjustment operations to determine a reordering to execute I/O requests, the disk driver 34 typically can optimize selection over a greater number of requests than the disk drive processor 18 because the memory and processing capabilities of the host 32 in which the disk driver 34 executes are typically greater than those of the components in the disk drive 2.

In further implementations, the disk driver 34 may order I/O requests according to additional factors. For instance, certain write operations may need to be executed before others to maintain data consistency in the storage. In such case, the disk driver 34 would select a first set of I/O requests ordered according to a priority adjusted delay time that must be applied before I/O requests in a second set, and transmit the first set to the disk driver 2 to execute before executing any of the I/O requests in the second set, which must be applied following the I/O requests in the first set to maintain consistency.

In certain implementations, the disk driver 34, or disk drive processor 18, may determine an ordering by recalculating the priority adjusted delay time for each selection, i.e., one I/O request having a lowest priority adjusted delay time from the current head position is selected, then the priority adjusted delay times are recalculated with respect to the last address processed in the previously selected I/O request to determine a next I/O request to process having a lowest priority adjusted delay time based on the recent recalculation. In such implementations, the disk driver 34, or disk drive processor 18, performs the reordering optimization algorithm for each I/O request.

Alternatively, additional algorithms may be used that involve calculations of time and degree to solve optimization/minimization problem to optimize across delay time and priority for a plurality of queued I/O requests.

ADDITIONAL IMPLEMENTATION DETAILS

The described disk management operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.) Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Certain implementations were described with respect to MR heads. However, the head assembly 8 may include read and/or write heads other than MR heads, e.g., ferrite, MIG, thin film, GMR, one-sided, two-sided, tunnel junction heads, atomic force microscope probes, etc., to determine non-mechanical noise arising from structural defects.

The described implementations may be implemented in disk drives that include multiple platters and multiple heads to read from one or both surfaces of each platter.

In the described implementations, I/O requests are commands queued against a hard disk drive. In alternative embodiments, the storage medium against which I/O requests are queued may be any suitable storage medium known in the art, such as tape cartridges, optical disk drives, holographic storage medium, CD-ROM, and any other non-volatile and volatile storage mediums known in the art.

In the described implementations, the algorithm performed at the device is used to determine an order in which to execute read and write requests against a storage medium. In alternative implementations, the algorithm performed to select requests to execute may be performed for output devices other than storage systems, such as printers, display monitors, etc., to determine an order in which requests transmitted to the output device are executed according to both a delay time associated in processing the request and a priority value assigned to the request.

In certain described implementations, the reordering operation is performed to select an I/O request to process when the disk head is idle or when a current I/O request is being processed and the next I/O request needs to be selected. In alternative implementations, the reordering operation may be performed at other times to select an I/O request to process. Further, the ordering may be determined for numerous I/O requests in advance of the time such I/O requests are to be processed.

The flowcharts of FIGS. 4 and 5 describe specific operations occurring in a particular order. However, those skilled in the art will appreciate that the logic described with respect to the flowcharts may be modified in that steps may be added, consolidated or modified. Further operations described as being performed sequentially may, in certain instances, be performed in parallel. Yet further, the operations described may be performed by a single processor or distributed across multiple processors.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for executing Input/Output (I/O) requests, comprising:
   determining delay times associated with processing a plurality of I/O requests;
   adjusting the determined delay times for the I/O requests according to priorities assigned to the I/O requests;
   determining an ordering of the I/O requests based on the adjusted delay times; and
   executing at least one I/O request according to the determined ordering.

2. The method of claim 1, wherein the I/O requests are directed to addressable locations on a storage medium accessed by an I/O mechanism, wherein determining the delay times comprises:
   determining delay times to access start addresses of the I/O requests on the storage medium from an I/O mechanism position.

3. The method of claim 2, wherein the I/O mechanism comprises a read/write head, and wherein the determined delay time for one I/O request includes a seek time and rotational time for the I/O mechanism to access the start address of the I/O request.

4. The method of claim 2, wherein the steps of determining the delay times and ordering based on the priority adjusted delay times are performed for each I/O request with respect to the I/O mechanism position after processing a previous I/O request.

5. The method of claim 2, wherein the I/O mechanism comprises a read/write head, wherein the read/write head and storage medium are contained in a storage unit, and wherein the steps of determining the delay times, adjusting the delay times according to the priority of the I/O requests, and determining the ordering of the I/O requests are performed by the storage unit.

6. The method of claim 2, wherein the I/O mechanism comprises a read/write head, wherein the read/write head and storage medium are contained in a storage unit, and wherein the steps adjusting the delay times according to the priority of the I/O requests and determining the ordering of the I/O requests are performed by a device driver program in a computer system coupled to the storage unit, further comprising:
   transmitting, with the device driver program, the I/O requests in the determined ordering to the storage unit, wherein the storage unit executes the at least one I/O request against the storage medium.

7. The method of claim 6, wherein executing the at least one I/O request against the storage medium comprises executing the at least one I/O request in the ordering determined by the device driver program.

8. The method of claim 6, wherein the step of determining the delay times are determined by the storage unit, further comprising:
   transmitting, with the storage unit, the determined delay times to the device driver program to use when adjusting the delay times according to the priority of the I/O requests.

9. The method of claim 1, further comprising:
creating sets of I/O requests ordered accorded to the determined ordering, wherein one set of I/O requests must be executed before any I/O requests in preceding sets can be executed.

10. The method of claim 1, wherein the priorities assigned to the I/O requests are assigned by at least one application program.

11. The method of claim 1, wherein determining the ordering comprises determining one queued I/O request to process next that has a minimum priority adjusted delay time.

12. The method of claim 11, wherein the priority adjusted delay time is adjusted downward for relatively higher priority I/O requests and adjusted upward for relatively lower priority requests.

13. A system for executing Input/Output (I/O) requests, comprising:
means for determining delay times associated with processing a plurality of I/O requests;
means for adjusting the determined delay times for the I/O requests according to priorities assigned to the I/O requests;
means for determining an ordering of the I/O requests based on the adjusted delay times; and
means for executing at least one I/O request according to the determined ordering.

14. The system of claim 13, further comprising:
a storage medium, wherein the I/O requests are directed to addressable locations on the storage medium;
an I/O mechanism for accessing addressable locations on the storage medium, wherein the means for determining the delay times determines delay times to access start addresses of the I/O requests on the storage medium from an I/O mechanism position.

15. The system of claim 14, wherein the means for determining the delay times and ordering based on the priority adjusted delay times performs the operations for each I/O request with respect to the I/O mechanism position after processing a previous I/O request.

16. The system of claim 14, wherein the I/O mechanism comprises a read/write head, further comprising:
a computer system;
a storage unit including the read/write head and storage medium and coupled to the computer system;
a device driver executing in the computer system, wherein the device driver performs the steps of adjusting the delay times according to the priority of the I/O requests and determining the ordering of the I/O requests;
means for transmitting, by the device driver program, the I/O requests in the determined ordering to the storage unit, wherein the storage unit executes the at least one I/O request against the storage medium.

17. The system of claim 13, further comprising:
means for creating sets of I/O requests ordered accorded to the determined ordering, wherein one set of I/O requests must be executed before any I/O requests in preceding sets can be executed.

18. The system of claim 13, wherein the means for determining the ordering determines one queued I/O request to process next that has a minimum priority adjusted delay time.

19. The system of claim 18, wherein the priority adjusted delay time is adjusted downward for relatively higher priority I/O requests and adjusted upward for relatively lower priority requests.

20. An article of manufacture comprising at least one of hardware logic or a computer readable medium including code executed by a processor for executing Input/Output (I/O) requests, comprising:
determining delay times associated with processing a plurality of I/O requests;
adjusting the determined delay times for the I/O requests according to priorities assigned to the I/O requests;
determining an ordering of the I/O requests based on the adjusted delay times; and
executing at least one I/O request according to the determined ordering.

21. The article of manufacture of claim 20, wherein the I/O requests are directed to addressable locations on a storage medium accessed by an I/O mechanism, wherein determining the delay times comprises:
determining delay times to access start addresses of the I/O requests on the storage medium from an I/O mechanism position.

22. The article of manufacture of claim 21, wherein the I/O mechanism comprises a read/write head, and wherein the determined delay time for one I/O request includes a seek time and rotational time for the I/O mechanism to access the start address of the I/O request.

23. The article of manufacture of claim 21, wherein the steps of determining the delay times and ordering based on the priority adjusted delay times are performed for each I/O request with respect to the I/O mechanism position after processing a previous I/O request.

24. The article of manufacture of claim 21, wherein the I/O mechanism comprises a read/write head, wherein the read/write head and storage medium are contained in a storage unit, and wherein the steps of determining the delay times, adjusting the delay times according to the priority of the I/O requests, and determining the ordering of the I/O requests are performed by the storage unit.

25. The article of manufacture of claim 21, wherein the I/O mechanism comprises a read/write head, wherein the read/write head and storage medium are contained in a storage unit, and wherein the steps adjusting the delay times according to the priority of the I/O requests and determining the ordering of the I/O requests are performed by a device driver program in a computer system coupled to the storage unit, further comprising:
transmitting, with the device driver program, the I/O requests in the determined ordering in the storage unit, wherein the storage unit executes the at least one I/O request against the storage medium.

26. The article of manufacture of claim 25, wherein executing the at least one I/O request against the storage medium comprises executing the at least one I/O request in the ordering determined by the device driver program.

27. The article of manufacture of claim 25, wherein the step of determining the delay times are determined by the storage unit, further comprising:
transmitting, with the processor, the determined delay times to the device driver program to use when adjusting the delay times according to the priority of the I/O requests.

28. The article of manufacture of claim 20, further comprising:
creating sets of I/O requests ordered accorded to the determined ordering, wherein one set of I/O requests must be executed before any I/O requests in preceding sets can be executed.

29. The article of manufacture of claim 20, wherein the priorities assigned to the I/O requests are assigned by at least one application program.

30. The article of manufacture of claim 20, wherein determining the ordering comprises determining one queued I/O request to process next that has a minimum priority adjusted delay time.

31. The article of manufacture of claim 30, wherein the priority adjusted delay time is adjusted downward for relatively higher priority I/O requests and adjusted upward for relatively lower priority requests.

32. The system of claim 13, wherein the system is in communication with at least one application program, wherein the priorities assigned to the I/O requests are assigned by the at least one application program.

* * * * *